(12) United States Patent
Jursch (10) Patent No.: US 9,970,652 B2
(45) Date of Patent: May 15, 2018

(54) SYSTEM AND METHOD OF INDIRECT LIGHTING FOR A TURNTABLE DISPLAY

(71) Applicant: Gibson Brands, Inc., Nashville, TN (US)

(72) Inventor: Gustave Jursch, Agoura Hills, CA (US)

(73) Assignee: Gibson Brands, Inc., Nashville, TN (US)

( * ) Notice: Subject to any disclaimer, the term of this patent is extended or adjusted under 35 U.S.C. 154(b) by 127 days.

(21) Appl. No.: 14/986,487

(22) Filed: Dec. 31, 2015

(65) Prior Publication Data

US 2016/0186987 A1    Jun. 30, 2016

Related U.S. Application Data

(60) Provisional application No. 62/098,953, filed on Dec. 31, 2014.

(51) Int. Cl.

| H04M 1/22 | (2006.01) |
|---|---|
| F21V 33/00 | (2006.01) |
| F21V 23/00 | (2015.01) |
| F21V 7/00 | (2006.01) |
| G11B 3/60 | (2006.01) |
| G11B 25/04 | (2006.01) |
| F21Y 115/10 | (2016.01) |

(52) U.S. Cl.
CPC ........ *F21V 33/0056* (2013.01); *F21V 7/0008* (2013.01); *F21V 7/0066* (2013.01); *F21V 23/003* (2013.01); *G11B 3/60* (2013.01); *F21Y 2115/10* (2016.08); *G11B 25/04* (2013.01)

(58) Field of Classification Search
CPC .. F21V 33/0056; F21V 7/0008; F21V 7/0066; F21V 23/003
USPC .......................................................... 362/86
See application file for complete search history.

(56) References Cited

U.S. PATENT DOCUMENTS

| 1,641,136 | A | * | 8/1927 | Dorn ...................... G11B 23/42 |
|---|---|---|---|---|
| | | | | 307/149 |
| 2,407,996 | A | | 9/1946 | Nies |
| 2,418,651 | A | * | 4/1947 | Mausshardt ........... G11B 23/42 |
| | | | | 356/23 |
| 2,788,437 | A | * | 4/1957 | Howle ............... G11B 19/2009 |
| | | | | 362/87 |

(Continued)

FOREIGN PATENT DOCUMENTS

| CN | 2 840 258 Y | 11/2006 |
|---|---|---|
| GB | 416 419 A | 9/1934 |

(Continued)

OTHER PUBLICATIONS

European Search Report and Written Opinion of the European Patent Office; May 20, 2016; p. 1-8; European Patent Office, Munich, Germany.

*Primary Examiner* — Bryon T Gyllstrom
(74) *Attorney, Agent, or Firm* — Bates & Bates, LLC; Daniel Beitey (57) ABSTRACT

A system and method for creating a visual display on an outer surface of a turntable platter. The system and method includes providing a light source around and directed toward the periphery of the platter that includes a number of reflective nodes on its outer peripheral surface. The reflective nodes project a lighted display around the outer periphery of the platter thereby creating a visual effect.

15 Claims, 6 Drawing Sheets

(56) References Cited

U.S. PATENT DOCUMENTS

| | | | | |
|---|---|---|---|---|
| 3,122,966 A | * | 3/1964 | Butterfield | G03B 31/06 |
| | | | | 353/18 |
| 3,885,797 A | * | 5/1975 | Booty | G11B 33/06 |
| | | | | 362/35 |
| 4,225,227 A | * | 9/1980 | Seitz | G01P 3/40 |
| | | | | 315/241 S |
| 4,354,142 A | * | 10/1982 | Seitz | H05B 33/0803 |
| | | | | 315/200 A |
| 7,604,361 B2 | * | 10/2009 | Pohlert | H04N 5/2354 |
| | | | | 362/11 |
| 2006/0087853 A1 | * | 4/2006 | Neumann | A63J 1/00 |
| | | | | 362/391 |
| 2006/0093777 A1 | * | 5/2006 | Handy | B32B 3/02 |
| | | | | 428/64.1 |
| 2012/0230175 A1 | * | 9/2012 | Ward | G11B 23/44 |
| | | | | 369/271.1 |

FOREIGN PATENT DOCUMENTS

| | | |
|---|---|---|
| GB | 1 494 928 A | 12/1977 |
| JP | S55 52601 U | 4/1980 |
| JP | S58 87176 U | 6/1983 |

* cited by examiner

SYSTEM AND METHOD OF INDIRECT LIGHTING FOR A TURNTABLE DISPLAY

CROSS-REFERENCE TO RELATED APPLICATION

The present document is based on and claims priority to U.S. Provisional Patent Application Ser. No. 62/098,953 filed on Dec. 31, 2014, the subject matter of which is incorporated herein by reference in its entirety.

FIELD OF THE INVENTION

This disclosure is directed toward lighted turntable and controller visual display. More specifically to providing a lighting source around substantially the entire peripheral edge of the rotatable platter to provide a visual display.

BACKGROUND

Typical turntable and controller assemblies use a single light source positioned on a side of a rotatable platter to illuminate a small portion of the platter's edge. The light source is typically a strobe light and the illumination is strictly limited to timing or otherwise correcting the phase of the platter rotational velocity relative to a desired or required platter rotational velocity. What is needed is a system and method of providing lighting around substantially the entire periphery of the platter. In this manner, a visual display may be created to supplement the audio display of the audio system.

SUMMARY

In an example embodiment, a lighted turntable display is provided. The turntable includes a housing and a rotatable platter supported by the housing. The platter defining an outer peripheral surface. A plurality of reflective nodes are positioned on the outer peripheral surface. Additionally, a plurality of light sources configured to direct light indirectly toward the nodes to provide a visual light display.

In another example embodiment, a system for providing a visual display, is provided. The system include a turntable having a housing and a platter, the platter defining an outer periphery. A plurality of reflective nodes are positioned on the outer periphery. A plurality of light sources for directing light indirectly at the reflective nodes around substantially the entire outer periphery.

In still another example embodiment, a method of providing a visual display, is provided. The method includes providing a turntable having a rotatable platter defining an outer periphery having reflective nodes thereon. Additionally, providing a plurality of light sources for providing a light directly into the reflective nodes. Also, controlling the light sources to provide a visual display by the light reflected off the reflective nodes.

Other principal features of the current disclosure will become apparent to those skilled in the art upon review of the following drawings, the detailed description, and the appended claims.

BRIEF DESCRIPTION OF THE DRAWINGS

Illustrative embodiments will be described referring to the accompanying drawings, wherein like numerals denote like elements.

DETAILED DESCRIPTION

Figure 1:
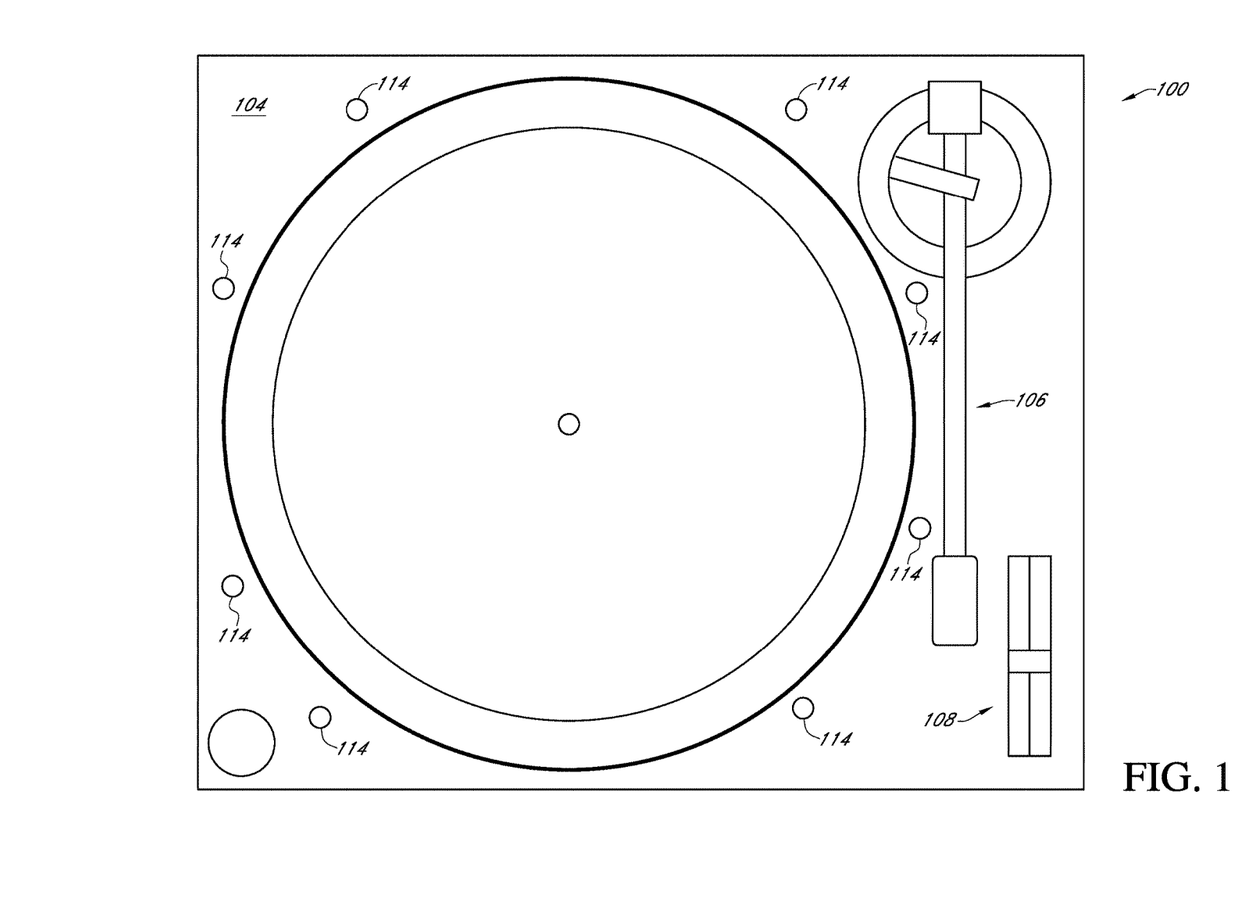
FIG. 1 depicts a top view of a system diagram of a turntable system in accordance with an illustrative embodiment.
Figure 2:
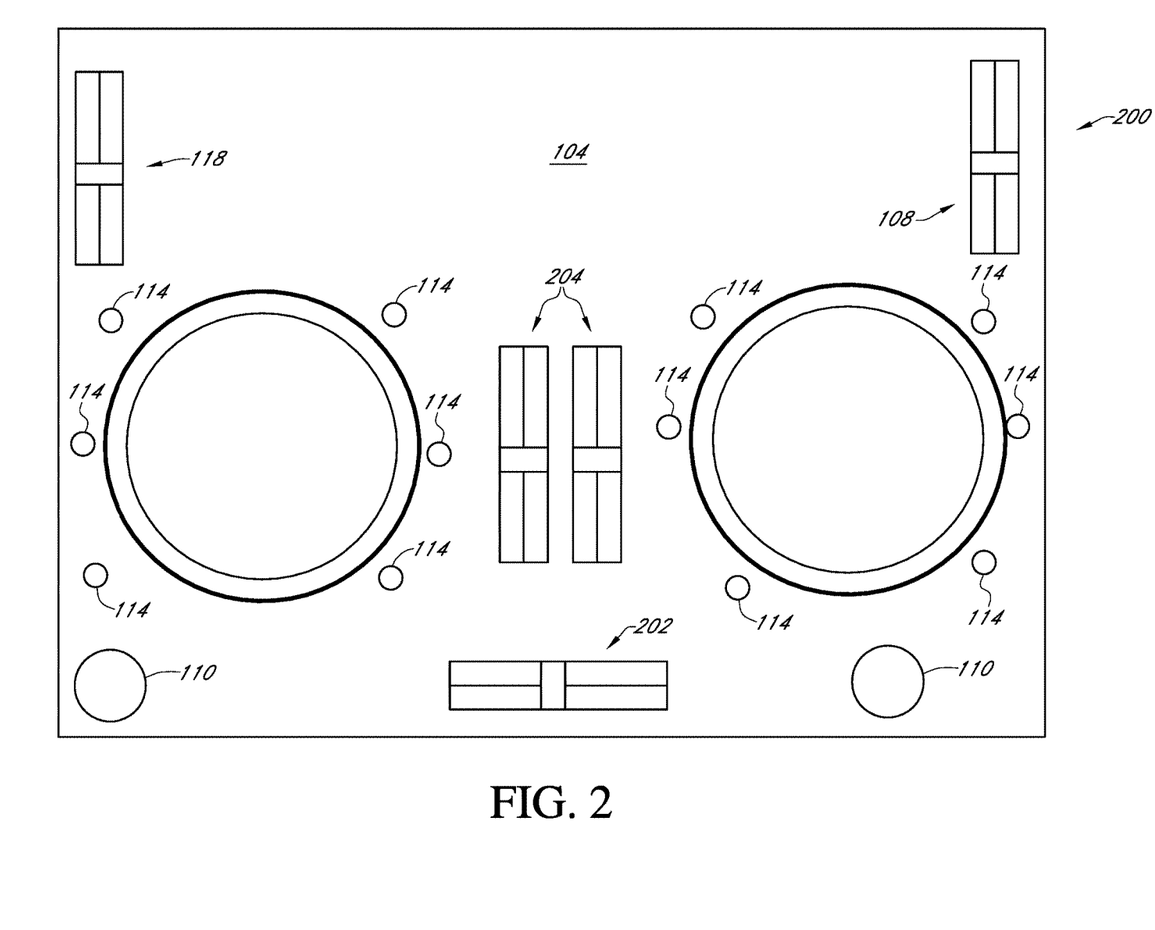
FIG. 2 depicts a top view of a system diagram of a controller system in accordance with an illustrative embodiment.
Figure 3:
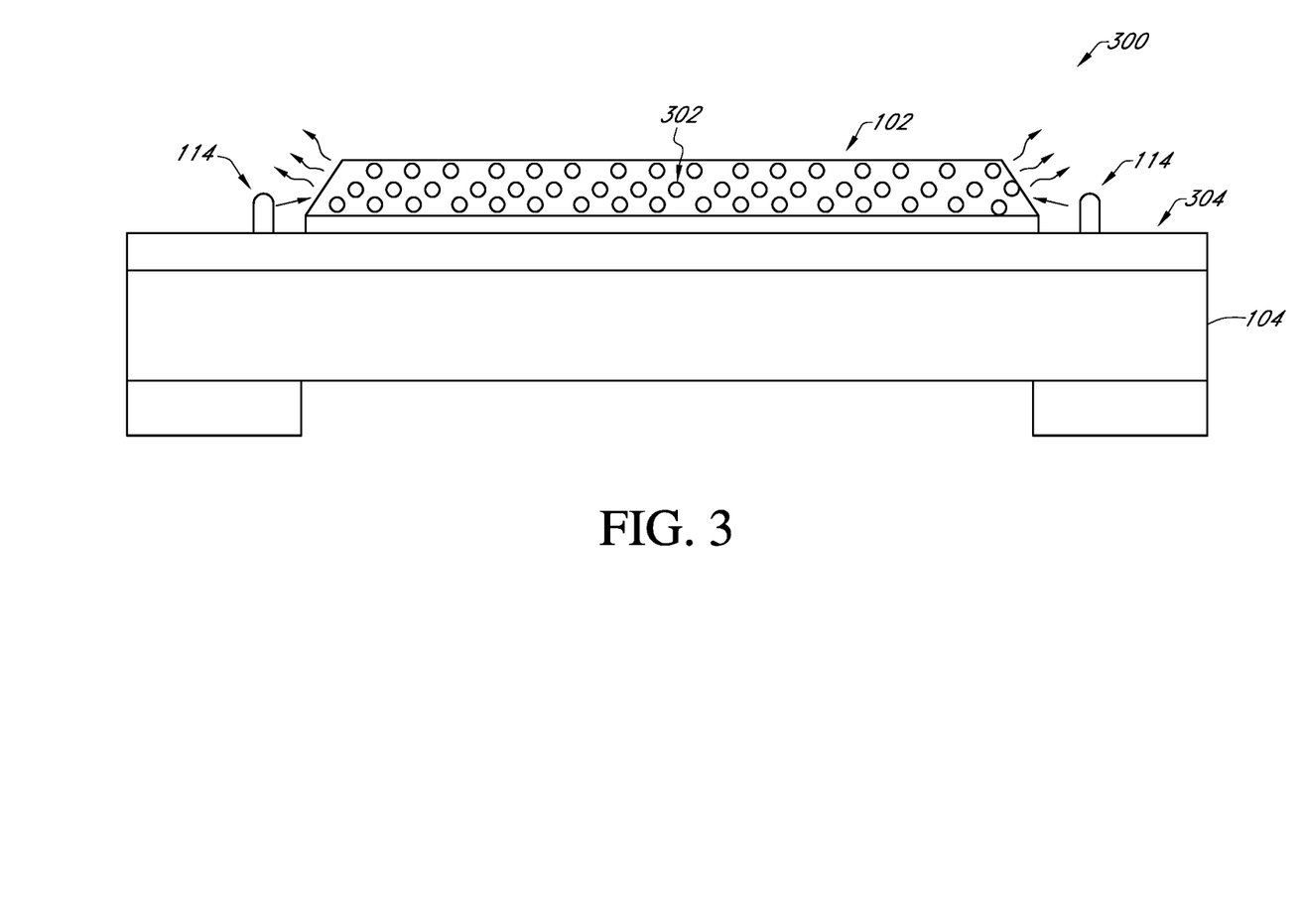
FIG. 3 depicts a first side view of the turntable system device in accordance with an illustrative embodiment.
Figure 4:
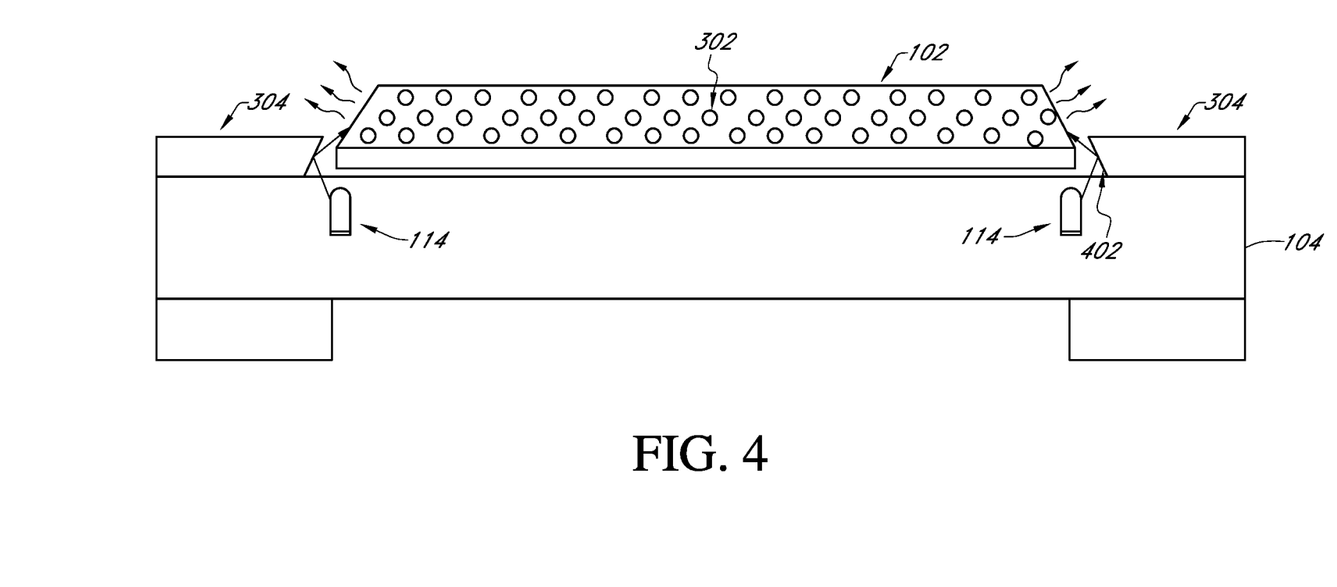
FIG. 4 depicts a second side view of the turntable system device in accordance with an illustrative embodiment.

Referring to FIGS. 1 and 2, a diagram of an audio system 100/200 is shown in accordance with an illustrative embodiment. In an illustrative embodiment, turntable system 100 may include a rotatable platter 102, a housing 104, a tone arm 106, light 114 and light controller 110. In the illustrative embodiment, audio system 100 is a turntable. Audio system 100/200 may also be a controller 200 such as those used to "scratch" music or otherwise manipulate the rotating platter 102 while in use. The audio system 100/200 may include other such features as pitch faders 108, various controls 110, cross fader 116, line faders 118/204, etc. In the illustrative embodiment, platter 102 includes a variety of reflective nodes 302 on the platter outer peripheral surface (FIGS. 3&4). The light 114, light controller 110 and nodes 302 are configured to reflect light off the nodes 302 in a desired manner to produce a visual display from the audio system 100/200.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to create and control the disclosed embodiments. Additionally, like numbers refer to like parts.

With specific reference to FIGS. 1 and 2, an illustrative depiction of the audio system 100/200 may be seen. As will be appreciated by those skilled in the art, the overall layout of the various component features is variable based on size and features of the specific audio system 100/200 employed. And as such, is not intended to limit the scope of this disclosure.

The lights 114 are positioned such that any desired amount of the platter's outer periphery may be illuminated. A user may select to not provide any light to the outer periphery or they may elect to illuminate the entire 360 degrees of the outer periphery, or any amount there between.

As depicted in the FIGS., the lights 114 may be stand alone, discrete units. Such as, for example, individual light emitting diodes (LED's). Conversely, the lights 114, may be collection of light elements such as LED strings or other connected lights sources (not shown). The specific nature or type of light is not intended to be limiting.

The lights 114 may be configured to produce a single type of light, such as white light. In addition, they may be configured to produce a variety of colored light such as red, blue and green. Likewise, each light 114 or light element in a string or other assortment (not shown) may be configured to produce a constant light source or a variable light source such as a strobe.

By way of non-limiting example, in one possible configuration, the audio system 100/200 may have multiple lights 114 positioned around the platter 102. All of the lights 114 may be configured to produce a constant white light. Conversely, they may all be configured to produce a white strobe light. Additionally, some or all of the lights 114 may be configured to produce a red light, a blue light and a green light. The various lights may be configured to produce constant or variable (strobe) colored light. Each light 114 may be configured and controlled independently from one another.

With reference to FIGS. 3 and 4, further illustrative aspects are disclosed. The platter 102 is configured to rotate on the housing 104. The platter 102 supports an LP album (not shown) or the like for play via the tone arm 106 and other assemblies. Around the outer periphery of the platter 102 are positioned a plurality of nodes 302. In one exemplary embodiment, the nodes 302 are evenly spaced and positioned on the outer periphery. In another exemplary embodiment, the nodes 302 may not be evenly distributed on the outer periphery. They may be arranged in some predetermined pattern desired by a user.

The nodes 302 are configured to reflect light. One illustrative embodiment of the node material choice is that of reflective metal such as a machined metal, such as aluminum, surface. However, other material choices are available. By way of non-limiting example, certain ceramics may be used to form the nodes 302. Additionally, polymers that have light reflective properties may be used. Further, nodes 302 constructed from various silica material like glass (clear or colored) are within the scope of this disclosure. Those skilled in the art will appreciate other materials availability as well and material choice should not be limiting provided the material reflects light.

As best depicted in FIG. 3, another illustrative embodiment is disclosed. Particularly, in this exemplary embodiment, they lights 114 are positioned on an upper surface of the audio system's top plate 304 such that the lights 114 are substantially in the same plane as the platter 102. In this manner, the lights 114 shine directly into the nodes 302. It will be appreciated that the lights 114 may be slightly above the platter 102 or slightly below the platter 102 (although still above the top surface of the top plate 304) without departing the spirit and scope of this exemplary embodiment.

An alternative illustrative embodiment is depicted best in FIG. 4. Here the lights are positioned in in plane below the top plate 304. In this manner, the top plate 304 has fewer elements on its surface. This slightly "cleaner" appearance may be desired by certain users.

In this illustrative embodiment, an inner edge of the top plate 304 is configured with a reflective surface 402 thereby permitting the lights 114 to direct light at reflective surface 402 and it will be reflected toward and off of the nodes 302. Like the node 302, the material choice for the reflective surface 402 is light reflective such as mirror or mirrored surfaces of metal, ceramic, glass (clear or colored), or suitable polymers.

In use, either illustrative embodiment a user directs light of a desired quality, color and nature into (either directly or indirectly) the nodes 302. The light is then reflected back off the nodes 302 to the surrounding environment. As the platter 102 turns, the nodes 302 move respectively and a visual display is reflected outward toward viewers. In this manner, a visual display of varying nature is produced for viewers. This provides visual stimulation to accompany any audio stimulation produced by the audio system 100/200. An overall enhanced user experience is produced.

Figure 5:
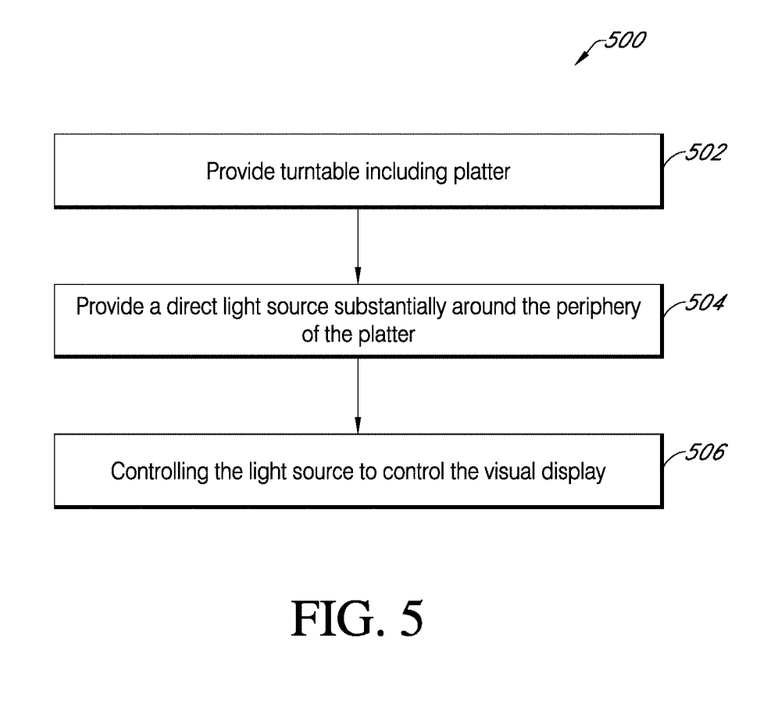
FIG. 5 depicts a flow diagram illustrating example operations performed by a lighted turntable device of the sound system of FIGS. 1 and 2 in accordance with an illustrative embodiment; and, FIG. 6 depicts a flow diagram illustrating example operations performed by a lighted turntable device of the sound system of FIGS. 1 and 2 in accordance with an illustrative embodiment.

With particular reference to FIG. 5, an illustrative embodiment is depicted. Specifically, an exemplary method of direct lighting for a turntable display 500 is disclosed. At block 502, an audio system 100/200 having a turntable with rotating platter is provided. Exemplary audio systems 100/200 are discussed and depicted herein. A direct light source substantially surrounding the outer periphery of the platter 102 is provided in block 504. Additionally, controlling the lights 114 such that a desired display is produced is provided in block 506.

Figure 6:
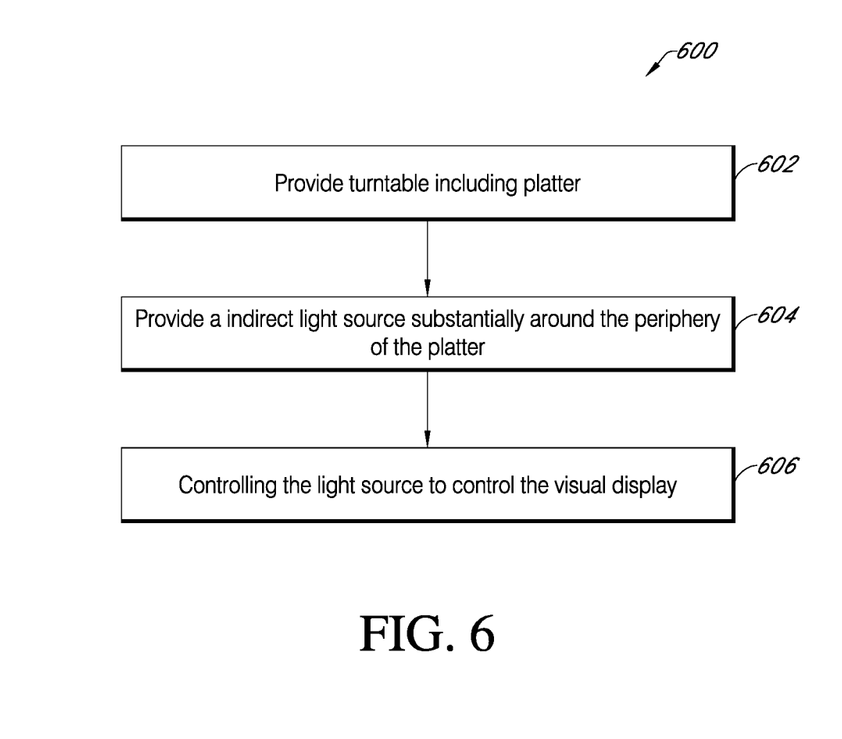

An additional illustrative embodiment is depicted in FIG. 6. In particular an exemplary method of indirectly lighting a turntable display 600 is depicted. At block 602, an audio system 100/200 having a turntable with rotating platter 102 is provided. Exemplary audio systems 100/200 are discussed and depicted herein. An indirect light source substantially surrounding the outer periphery of the platter 102 is provided in block 604. Additionally, controlling the indirect lights 114 such that a desired visual display is produced is provided in block 606.

In an illustrative embodiment a lighted turntable display is disclosed. Included are a housing having a reflective surface in a top surface and a rotatable platter supported by the housing, the platter defining an outer peripheral surface. Also depicted are a plurality of reflective nodes positioned on the outer peripheral surface. Further, a plurality of light sources configured to direct light directly toward a reflective surface and reflecting toward the nodes to provide a visual light display.

A further illustrative embodiment includes the reflective nodes are constructed from at least one of a reflective metal, glass, ceramic, and polymer.

A further illustrative embodiment includes controlling the plurality of light sources such that adjacent light sources are producing substantially the same type and quality of light.

A still further illustrative embodiment includes controlling the plurality of light sources such that adjacent light sources are producing substantially a different type or quality of light.

A further illustrative embodiment includes the different type or quality of light is at least one of a constant light source, strobe light source, white light source, or colored light source.

A further illustrative embodiment includes the colored light source is at least one of a red, green, or blue.

A further illustrative embodiment includes he plurality of light sources are light emitting diodes (LEDs).

A further illustrative embodiment includes a controller, the controller coupled to the light source for controllably illuminating the plurality of light sources, wherein the controller is configurable for producing different patterns of light from the plurality of light sources.

An illustrative embodiment includes a system for providing visual display. The system includes a turntable having a housing having a reflective surface in a top surface and a platter, the platter defining an outer periphery. Additionally, the system includes a plurality of reflective nodes on the outer periphery. Also included are a plurality of light sources for directing light directly at the reflective surface and reflecting toward reflective nodes around substantially all of the outer periphery.

A further illustrative embodiment includes a controller for controlling the plurality of light sources wherein the controller is configurable for producing different patterns of light from the plurality of light sources.

A further illustrative embodiment includes the plurality of light sources are configured to provide at least one of a white light, red light, green light, or blue light.

An illustrative embodiment includes a method of providing a visual display. The method includes providing a turntable having a rotatable platter defining an outer periphery having reflective nodes thereon. Additionally, the method includes providing a plurality of light sources for providing a light indirectly into the reflective nodes. Also included in the method is controlling the light sources to provide a visual display by the light reflected off the reflective nodes.

A further illustrative embodiment includes providing a plurality of light sources is configured such that the plurality of light sources direct light at substantially all of the platter's outer periphery.

A further illustrative embodiment includes controlling the light sources includes each light source producing substantially the same light quality and color.

A further illustrative embodiment includes controlling the light sources includes each light source producing different light quality and color.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A lighted turntable display, comprising:
   a housing having a reflective surface in a top surface;
   a rotatable platter supported by the housing, the platter defining an outer peripheral surface;
   a plurality of reflective nodes positioned on the outer peripheral surface; and,
   a plurality of light sources configured to direct light directly toward the reflective surface of the housing and reflectively toward the plurality of nodes to provide a visual light display.

2. The display of claim 1, wherein the reflective nodes are constructed from at least one of a reflective metal, glass, ceramic, and polymer.

3. The display of claim 1, further comprising controlling the plurality of light sources such that adjacent light sources are producing substantially the same type and quality of light.

4. The display of claim 1, further comprising controlling the plurality of light sources such that adjacent light sources are producing substantially a different type or quality of light.

5. The display of claim 4, wherein the different type or quality of light is at least one of a constant light source; strobe light source, white light source, or colored light source.

6. The display of claim 5, wherein the colored light source is at least one of a red, green, or blue.

7. The display of claim 1, wherein the plurality of light sources are light emitting diodes (LEDs).

8. The device of claim 1, further comprising a controller, the controller coupled to the light source for controllably illuminating the plurality of light sources, wherein the controller is configurable for producing different patterns of light from the plurality of light sources.

9. A system for providing visual display, comprising:
   a turntable having a housing having a reflective surface in a top surface, and a platter, the platter defining an outer periphery;
   a plurality of reflective nodes formed on the outer periphery; and,
   a plurality of light sources for directing light directly at the reflective surface of the housing and reflecting the light toward the reflective nodes around substantially all of the outer periphery.

10. The system of claim 9, further comprising a controller for controlling the plurality of light sources wherein the controller is configurable for producing different patterns of light from the plurality of light sources.

11. The system of claim 9, wherein the plurality of light sources are configured to provide at least one of a white light, red light, green light, or blue light.

12. A method of providing a visual display, comprising:
   providing a turntable having a rotatable platter defining an outer periphery, the outer periphery having reflective nodes thereon;
   providing a plurality of light sources for providing a light indirectly into the reflective nodes; and,
   controlling the light sources to provide a visual display by the light reflected off the reflective nodes.

13. The method of claim 12, wherein the providing a plurality of light sources is configured such that the plurality of light sources direct light at substantially all of the platter's outer periphery.

14. The method of claim 12, wherein controlling the light sources includes each light source producing substantially the same light quality and color.

15. The method of claim 12, wherein controlling the light sources includes each light source producing different light quality and color.

* * * * *